United States Patent
Chalk et al.

(10) Patent No.: US 7,895,861 B2
(45) Date of Patent: Mar. 1, 2011

(54) CONFORMABLE NOSING DEVICE FOR REDUCING MOTION AND STRESS WITHIN A GLASS SHEET WHILE MANUFACTURING THE GLASS SHEET

(75) Inventors: Paul Gregory Chalk, Danville, KY (US); Chester Hann Huei Chang, Painted Post, NY (US); Patrick Jean Pierre Herve, Avon (FR); Keith Leonard House, Corning, NY (US); Michael Yoshiya Nishimoto, Painted Post, NY (US); Yawei Sun, Horseheads, NY (US); Naiyue Zhou, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 615 days.

(21) Appl. No.: 11/801,213

(22) Filed: May 9, 2007

(65) Prior Publication Data

US 2008/0276646 A1 Nov. 13, 2008

(51) Int. Cl.
*C03B 17/00* (2006.01)
*C03B 17/02* (2006.01)
*C03B 21/00* (2006.01)
*C03B 21/02* (2006.01)

(52) U.S. Cl. ............. 65/97; 65/66; 65/90; 65/93; 65/94; 65/174

(58) Field of Classification Search .................. 225/104, 225/105; 65/66, 90, 93, 94, 97, 106, 145, 65/174, 184–186, 195
See application file for complete search history.

(56) References Cited

U.S. PATENT DOCUMENTS

| | | | |
|---|---|---|---|
| 3,338,696 A | 8/1967 | Dockerty | |
| 3,682,609 A | 8/1972 | Dockerty | |
| 4,471,304 A * | 9/1984 | Wolf | 324/207.24 |
| 4,508,556 A * | 4/1985 | Bennett et al. | 65/25.4 |
| 4,511,386 A * | 4/1985 | Kellar et al. | 65/273 |
| 5,154,334 A | 10/1992 | Dekker et al. | 225/2 |
| 6,247,625 B1 | 6/2001 | Chakrabarti et al. | 225/96.5 |
| 6,269,994 B1 | 8/2001 | Harrington | 225/96.5 |
| 6,363,753 B1 * | 4/2002 | Yoshizawa et al. | 65/287 |
| 6,460,258 B1 | 10/2002 | Shimotoyodome | 33/18.1 |
| 6,536,121 B1 | 3/2003 | Ishikawa et al. | 33/18.1 |
| 6,616,025 B1 | 9/2003 | Andrewlavage, Jr. | 225/96.5 |
| 6,749,926 B1 | 6/2004 | Yoshizawa | 428/174 |
| 2006/0042314 A1 | 3/2006 | Abbott, III et al. | 65/25.3 |
| 2006/0255083 A1 | 11/2006 | Bonaddio et al. | 225/2 |
| 2006/0261118 A1 | 11/2006 | Cox et al. | 225/96 |
| 2006/0280920 A1 | 12/2006 | Abbott, III | 428/210 |

FOREIGN PATENT DOCUMENTS

JP 2008019102 A 1/2008

* cited by examiner

*Primary Examiner* — Khanh Nguyen
*Assistant Examiner* — Carson Gross
(74) *Attorney, Agent, or Firm* — Kevin M. Able

(57) ABSTRACT

A conformable nosing device is described herein which conforms to have a bowed shape that substantially matches a bowed shape of a glass sheet and which engages the glass sheet to help minimize the motion of the glass sheet and to help reduce the stress within the glass sheet while the glass sheet is being scored and separated into individual glass sheets. In addition, the conformable nosing device can include a passive nosing device which can be controlled to further help minimize the motion of the glass sheet while the glass sheet is being scored and separated into individual glass sheets.

19 Claims, 11 Drawing Sheets

CONFORMABLE NOSING DEVICE FOR REDUCING MOTION AND STRESS WITHIN A GLASS SHEET WHILE MANUFACTURING THE GLASS SHEET

CROSS REFERENCE TO RELATED APPLICATION

This application is related to U.S. patent application Ser. No. 11/801,212 filed concurrently herewith and entitled "Constant Force Scoring Device and Method for Using Same". The contents of this document are hereby incorporated by reference herein.

TECHNICAL FIELD

The present invention relates in general to the glass manufacturing field and, in particular, to a conformable nosing device which conforms to have a bowed shape that substantially matches a bowed shape of a glass sheet and which engages the glass sheet to help minimize the motion of the glass sheet and to help reduce the stress within the glass sheet while the glass sheet is being scored and separated into individual glass sheets.

BACKGROUND

Corning Incorporated has developed a process known as the fusion process (e.g., downdraw process) to form high quality thin glass sheets that can be used in a variety of devices like flat panel displays (e.g., flat panel liquid crystal displays). The fusion process is the preferred technique for producing glass sheets used in flat panel displays because the glass sheets produced by this process have surfaces with superior flatness and smoothness when compared to glass sheets that are produced by other methods. The fusion process is briefly described below with respect to FIG. 1 but for a more detailed description reference is made to co-assigned U.S. Pat. Nos. 3,338,696 and 3,682,609 (the contents of these two patents are hereby incorporated by reference herein).

Referring to FIG. 1 (PRIOR ART), there is shown a schematic view of an exemplary glass manufacturing system 100 that uses the fusion process (e.g., downdraw process) to make a glass sheet 105. The glass manufacturing system 100 includes a melting vessel 110, a fining vessel 115, a mixing vessel 120 (e.g., stir chamber 120), a delivery vessel 125 (e.g., bowl 125), a fusion draw machine (FDM) 141 and a traveling anvil machine (TAM) 150. The melting vessel 110 is where the glass batch materials are introduced as shown by arrow 112 and melted to form molten glass 126. The fining vessel 115 (e.g., finer tube 115) has a high temperature processing area that receives the molten glass 126 (not shown at this point) from the melting vessel 110 and in which bubbles are removed from the molten glass 126. The fining vessel 115 is connected to the mixing vessel 120 (e.g., stir chamber 120) by a finer to stir chamber connecting tube 122. And, the mixing vessel 120 is connected to the delivery vessel 125 by a stir chamber to bowl connecting tube 127.

The delivery vessel 125 delivers the molten glass 126 through a downcomer 130 into the FDM 141 which includes an inlet 132, a forming vessel 135 (e.g., isopipe 135), and a pull roll assembly 140. As shown, the molten glass 126 from the downcomer 130 flows into an inlet 132 which leads to the forming vessel 135 (e.g., isopipe 135). The forming vessel 135 includes an opening 136 that receives the molten glass 126 which flows into a trough 137 and then overflows and runs down two sides 138a and 138b before fusing together at what is known as a root 139. The root 139 is where the two sides 138a and 138b come together and where the two overflow walls of molten glass 126 rejoin (e.g., refuse) before being drawn downward by the pull roll assembly 140 to form the glass sheet 105.

The pull roll assembly 140 delivers the drawn glass sheet 105 (which at this point in the process has a curved/bowed shape) to the TAM 150 which includes a flat nosing device 152 and a scoring device 154 that are used to score and separate the bowed glass sheet 105 into distinct pieces of glass sheets 105 (see the enlarged top view of the TAM 150 illustrated in FIG. 1). The scoring device 154 is not used until after the flat nosing device 152 engages the bowed glass sheet 105. The flat nosing device 152 by engaging the bowed glass sheet 105 tends to flatten the bowed glass sheet 105 (this process is known as pressing). Then, the scoring device 154 extends a scoring wheel 156 which scores the glass sheet 105 and also pushes the bowed glass sheet 105 even more against the flat nosing device 152 (this process step is known as ironing). After scoring, the flattened glass sheet 105 is bent in a direction perpendicular to it's original curved surface and separated to create a smaller glass sheet 105 which is shown located below the TAM 150.

The pressing, ironing, scoring and separating processes cause motion in the glass sheet 105 which in turn contribute to the creation of stress variations within the glass sheet 105. There are several problems which can occur whenever the glass sheet 105 is stressed. For example, a stressed glass sheet 105 can distort/warp which is not a desirable situation for the customers. Plus, a large glass sheet 105 may be stressed yet undistorted but then that large glass sheet 105 will later distort/warp when it is subsequently cut into smaller pieces of glass sheets. This is not desirable. Accordingly, there is a need for a device that helps prevent the motion of the glass sheet 105 and helps prevent the creation of stress variation within the glass sheet 105 while the glass sheet is being scored and separated into individual glass sheets. This need and other needs are satisfied by the conformable nosing device of the present invention.

SUMMARY

The present invention includes a conformable nosing device which can be conformed to have a bowed shape that substantially matches a bowed shape of a glass sheet and which is used to help minimize the motion of the glass sheet and to help prevent the creation of stress variation within the glass while the glass sheet is being scored and separated into individual glass sheets. In one embodiment, the conformable nosing device includes: (1) a flexible beam; (2) a nosing material that is attached to a first side of the flexible beam; (3) a support bracket; and (4) multiple extendable elements. Each extendable element has a first end attached to a predetermined location on the support bracket and a second end attached to a predetermined location on a second side of the flexible beam. Plus, each extendable element is either extended to push on the flexible beam, retracted to pull on the flexible beam or left in a neutral position that neither pushes on or pulls on the flexible beam so the flexible beam is conformed to have a bowed shape that substantially matches a bowed shape of a glass sheet. Thus, when the conformable nosing device engages the glass sheet it helps to minimize the motion of the glass sheet and reduce the creation of stress variation within the glass sheet while the glass sheet is being scored and separated into smaller glass sheets. In addition, the present invention provides a glass manufacturing system and a method which uses the conformable nosing device to produce a glass sheet.

BRIEF DESCRIPTION OF THE DRAWINGS

A more complete understanding of the present invention may be had by reference to the following detailed description when taken in conjunction with the accompanying drawings wherein.

DETAILED DESCRIPTION

Figure 1:
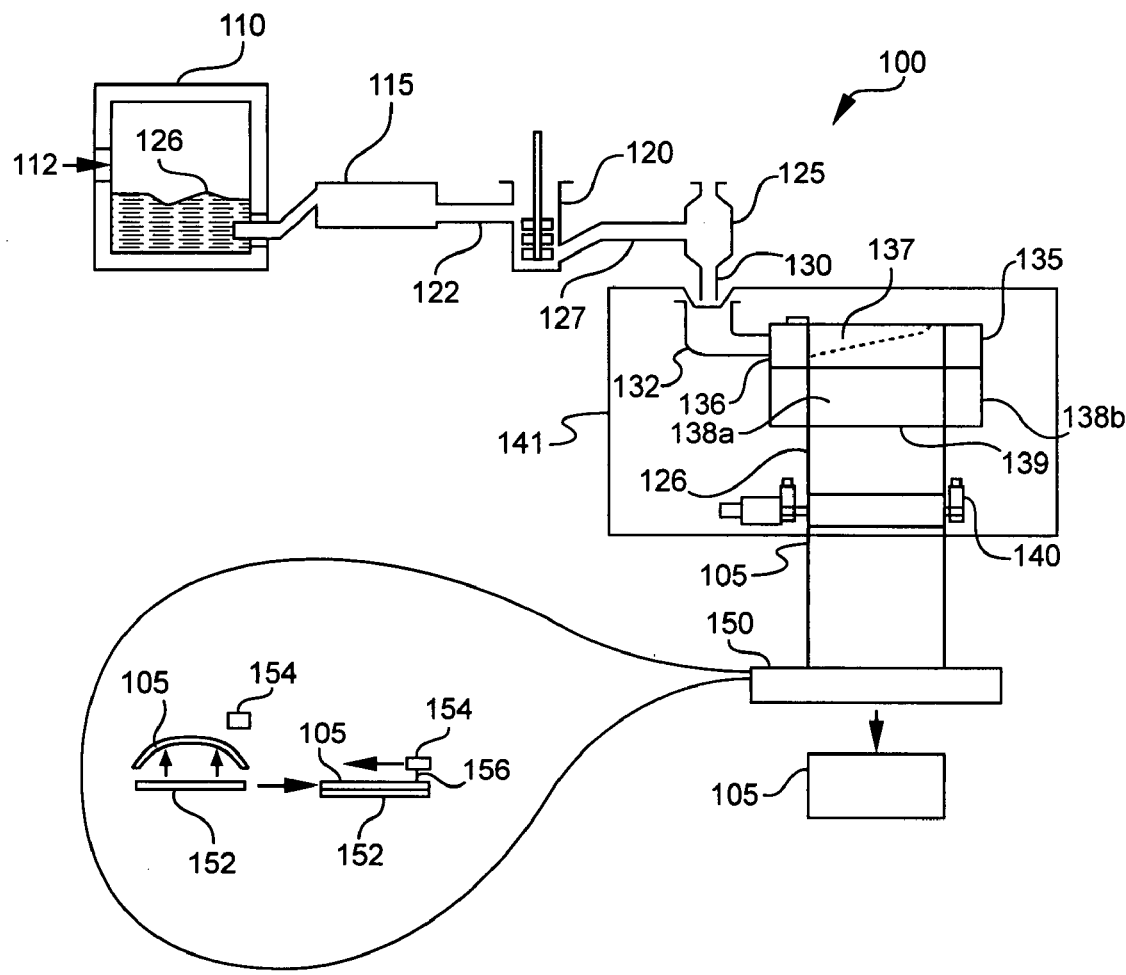
FIG. 1 (PRIOR ART) is a schematic view of an exemplary glass manufacturing system which uses a traditional non-conformable flat nosing device when manufacturing a glass sheet.
Figure 2:
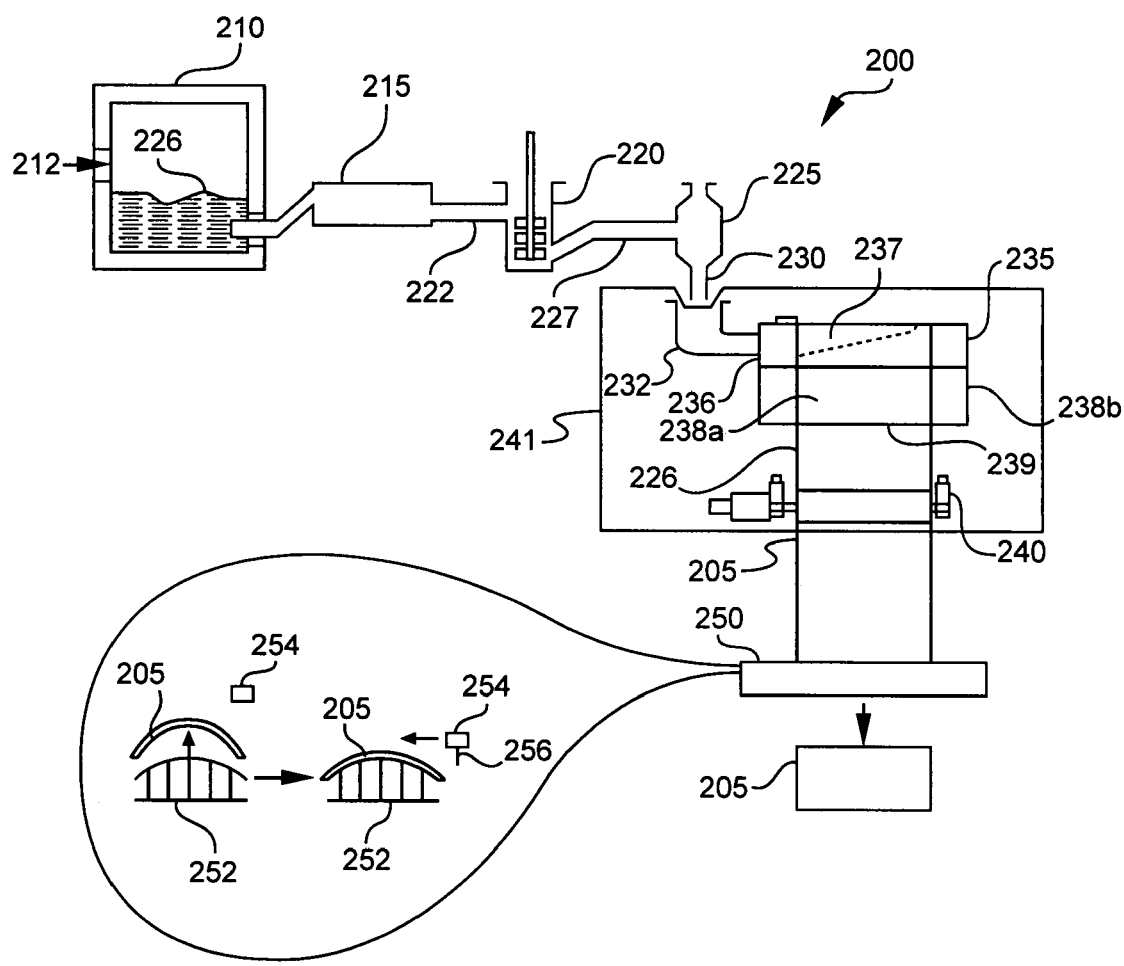
FIG. 2 is a schematic view of an exemplary glass manufacturing system which uses a conformable nosing device when manufacturing a glass sheet in accordance with the present invention.

Referring to FIG. 2, there is shown a schematic view of an exemplary glass manufacturing system 200 utilizing a conformable nosing device 252 in accordance with the present invention. The glass manufacturing system 200 includes a melting vessel 210, a fining vessel 215, a mixing vessel 220 (e.g., stir chamber 220), a delivery vessel 225 (e.g., bowl 225), a FDM 241 and a TAM 250. The melting vessel 210 is where the glass batch materials are introduced as shown by arrow 212 and melted to form molten glass 226. The fining vessel 215 (e.g., finer tube 215) has a high temperature processing area that receives the molten glass 226 (not shown at this point) from the melting vessel 210 and in which bubbles are removed from the molten glass 226. The fining vessel 215 is connected to the mixing vessel 220 (e.g., stir chamber 220) by a finer to stir chamber connecting tube 222. And, the mixing vessel 220 is connected to the delivery vessel 225 by a stir chamber to bowl connecting tube 227.

The delivery vessel 225 delivers the molten glass 226 through a downcomer 230 into the FDM 241 which includes an inlet 232, a forming vessel 235 (e.g., isopipe 235), and a pull roll assembly 240. As shown, the molten glass 226 from the downcomer 230 flows into an inlet 232 which leads to the forming vessel 235 (e.g., isopipe 235). The forming vessel 235 includes an opening 236 that receives the molten glass 226 which flows into a trough 237 and then overflows and runs down two sides 238a and 238b before fusing together at what is known as a root 239. The root 239 is where the two sides 238a and 238b come together and where the two overflow walls of molten glass 226 rejoin (e.g., refuse) before being drawn downward by the pull roll assembly 240 to form the glass sheet 205.

The pull roll assembly 240 delivers the drawn glass sheet 205 (which at this point in the process has a curved/bowed shape) to the TAM 250 which includes a conformable nosing device 252 and a scoring device 254 that are used to score and separate the bowed glass sheet 205 into distinct pieces of glass sheets 205 (see the enlarged top view of the TAM 250 illustrated in FIG. 2). The conformable nosing device 252 is set up to have a bowed shape that substantially matches the bowed shape of the glass sheet 205. Then, the conformable nosing device 252 is moved so as to engage one side of the bowed glass sheet 205 after which the scoring device 254 extends a scoring wheel 256 that scores the exposed side of the bowed glass sheet 205. After scoring, the bowed glass sheet 205 is bent in a direction perpendicular to the curved surface and separated to create a smaller glass sheet 205 which is shown located below the TAM 250.

The conformable nosing device 252 is a marked improvement over the traditional flat nosing 152 in that the bowed sheet 205 does not need to be pressed and ironed when it is scored by the scoring device 254. In particular, the conformable nosing device 252, by having a bowed shape that substantially matches the bowed shape of the glass sheet 205, helps prevent the motion of the glass sheet 205 during the scoring and separating processes and thus helps prevent the creation of the problematical stress in the glass sheet 205. Two exemplary embodiments of the conformable nosing device 252 are described in detail below with respect to FIGS. 3-4.

Figure 3A:
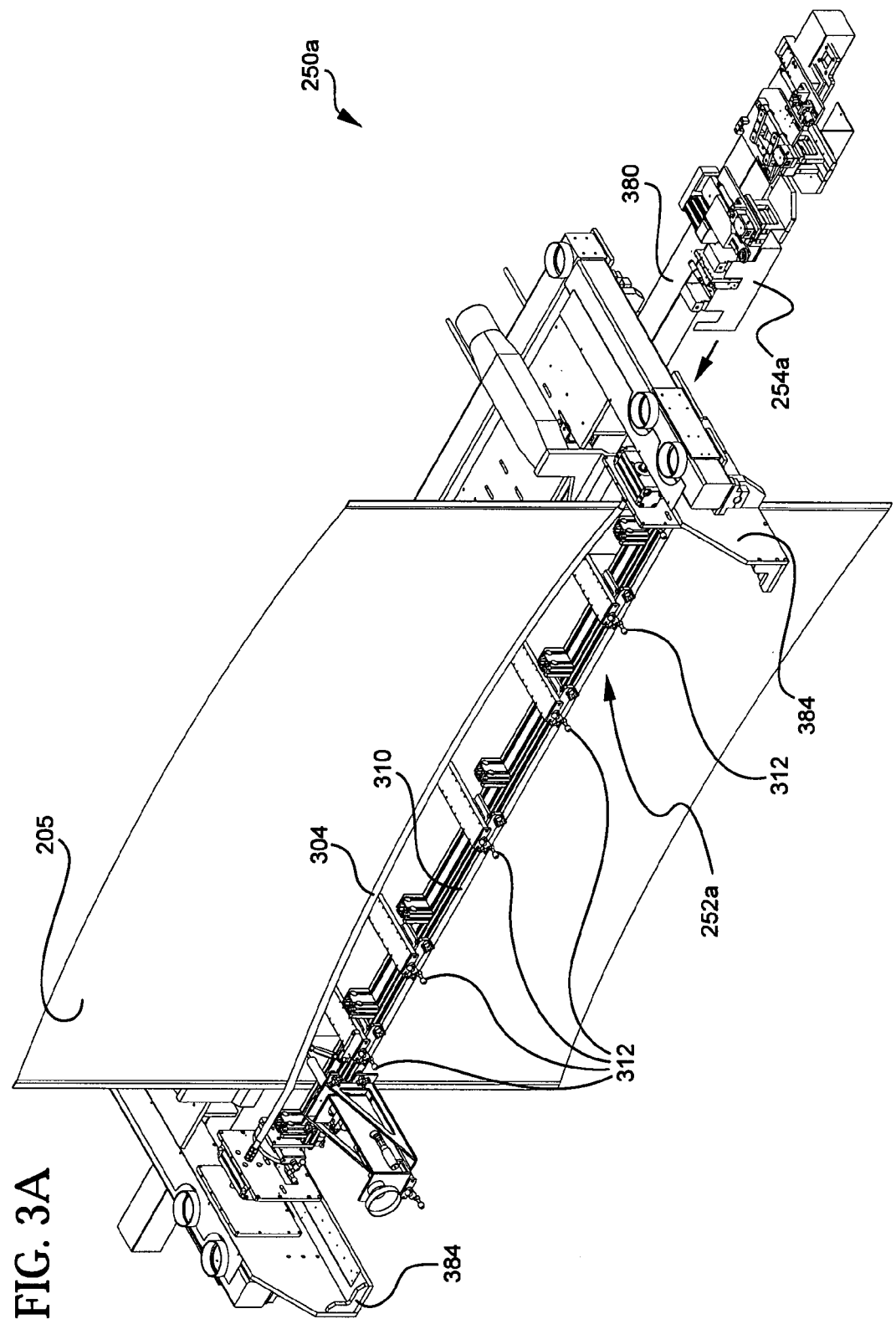
FIGS. 3A-3O are diagrams which illustrate in greater detail the various components of the conformable nosing device in accordance with a first embodiment of the present invention.
Figure 3B:
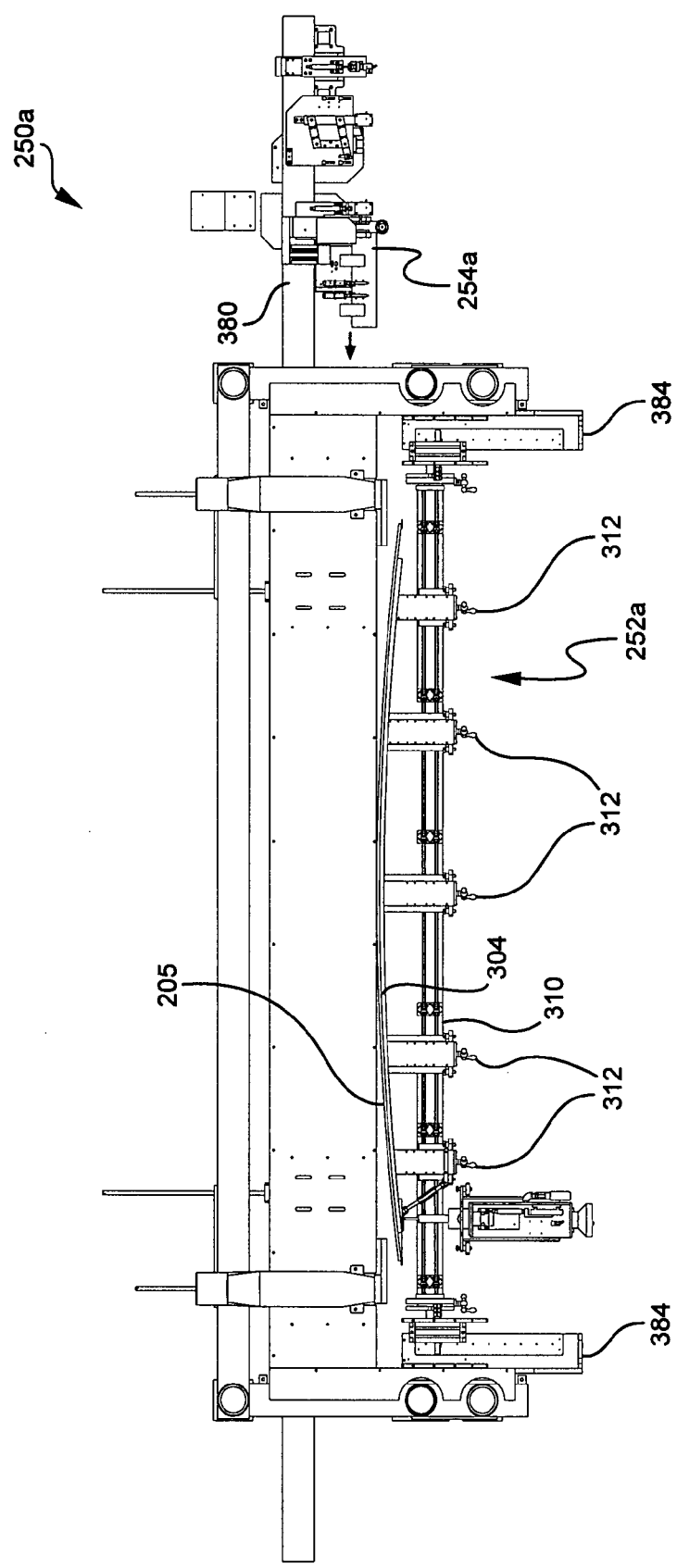
Figure 3C:
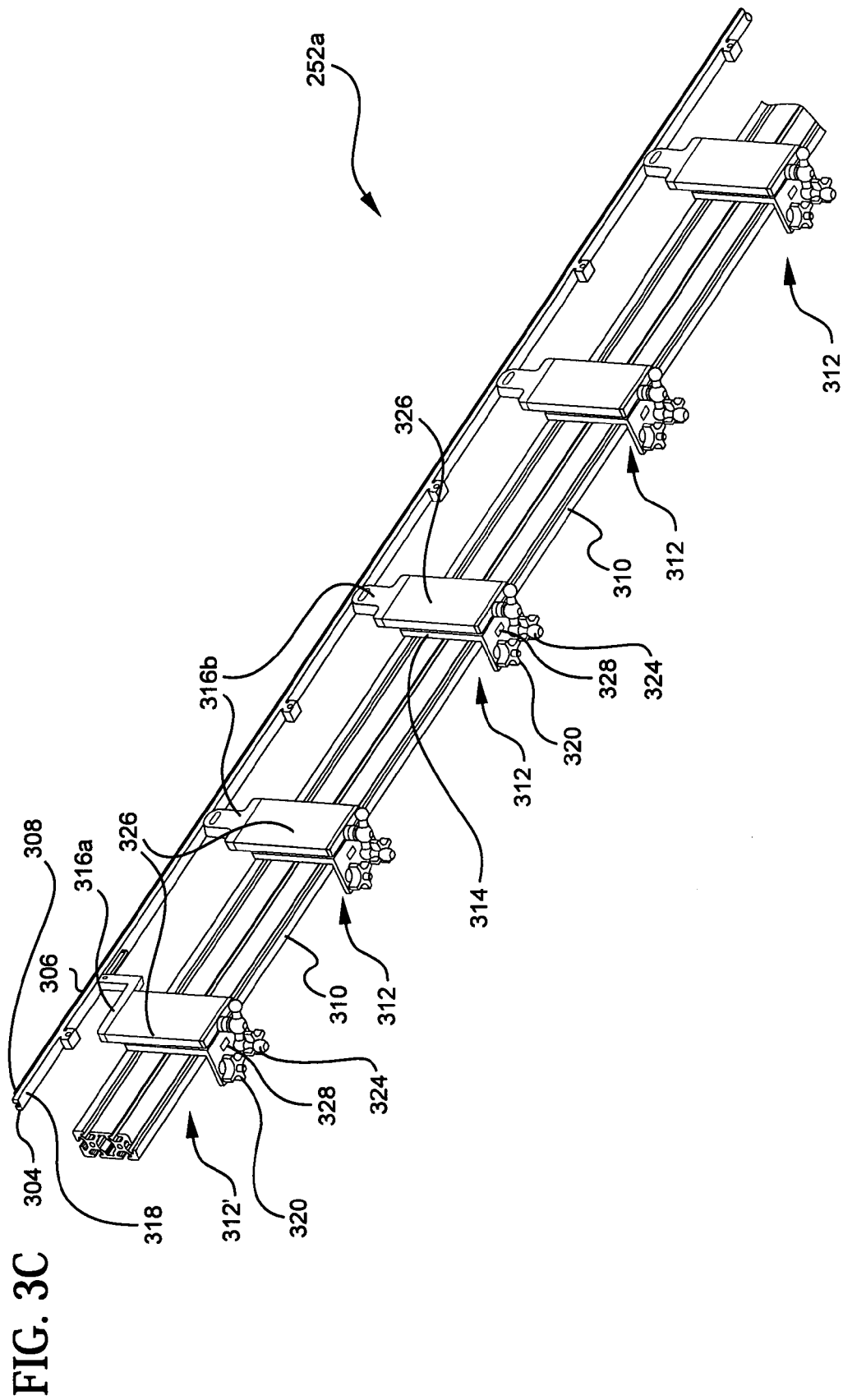
Figure 3D:
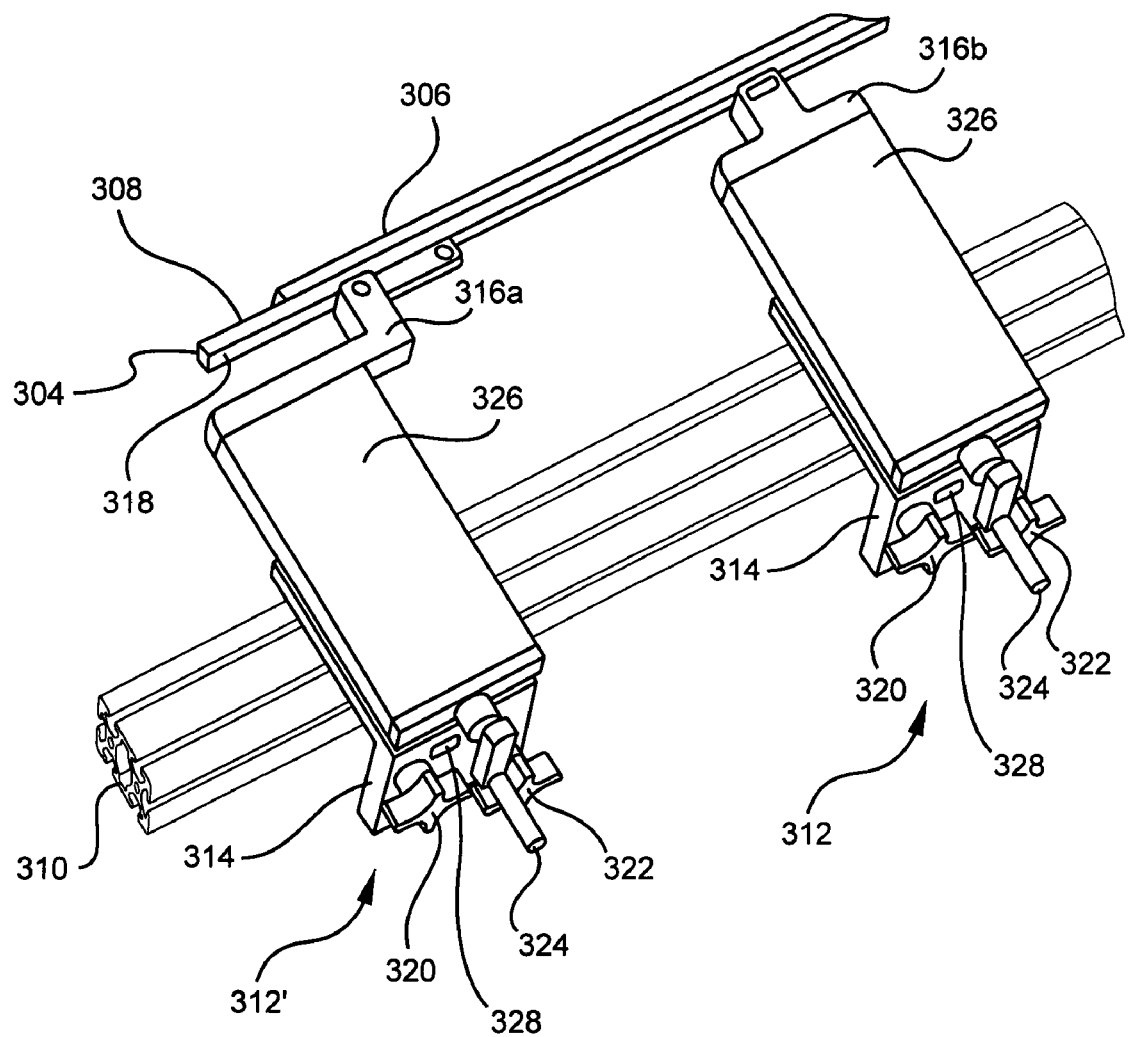
Figure 3E:
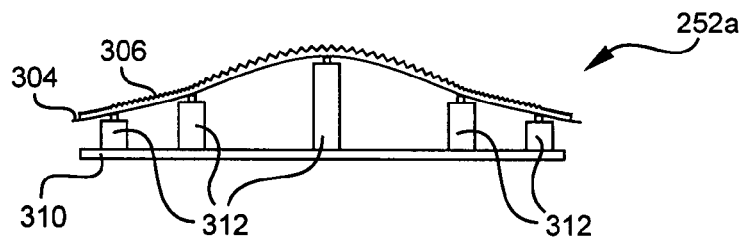
Figure 3F:
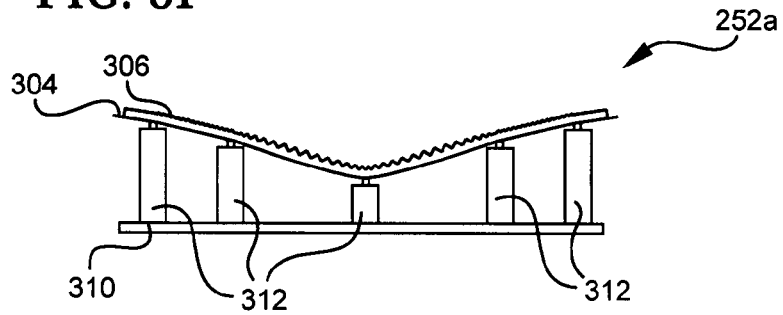
Figure 3G:
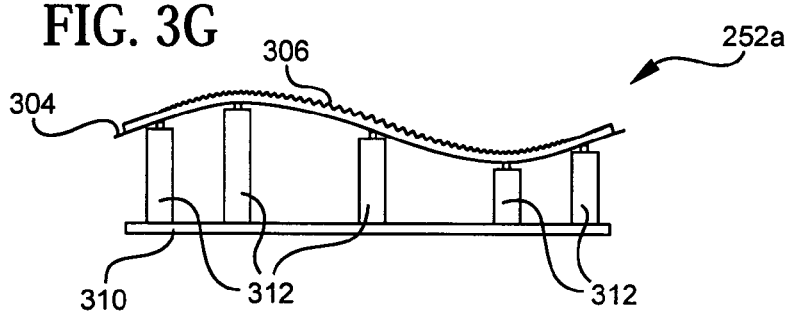
Figure 3H:
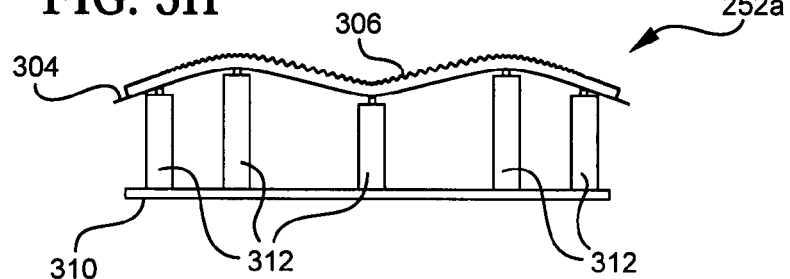
Figure 3I:
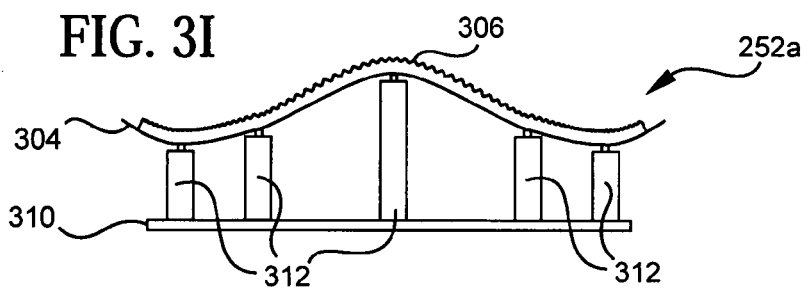
Figure 3J:
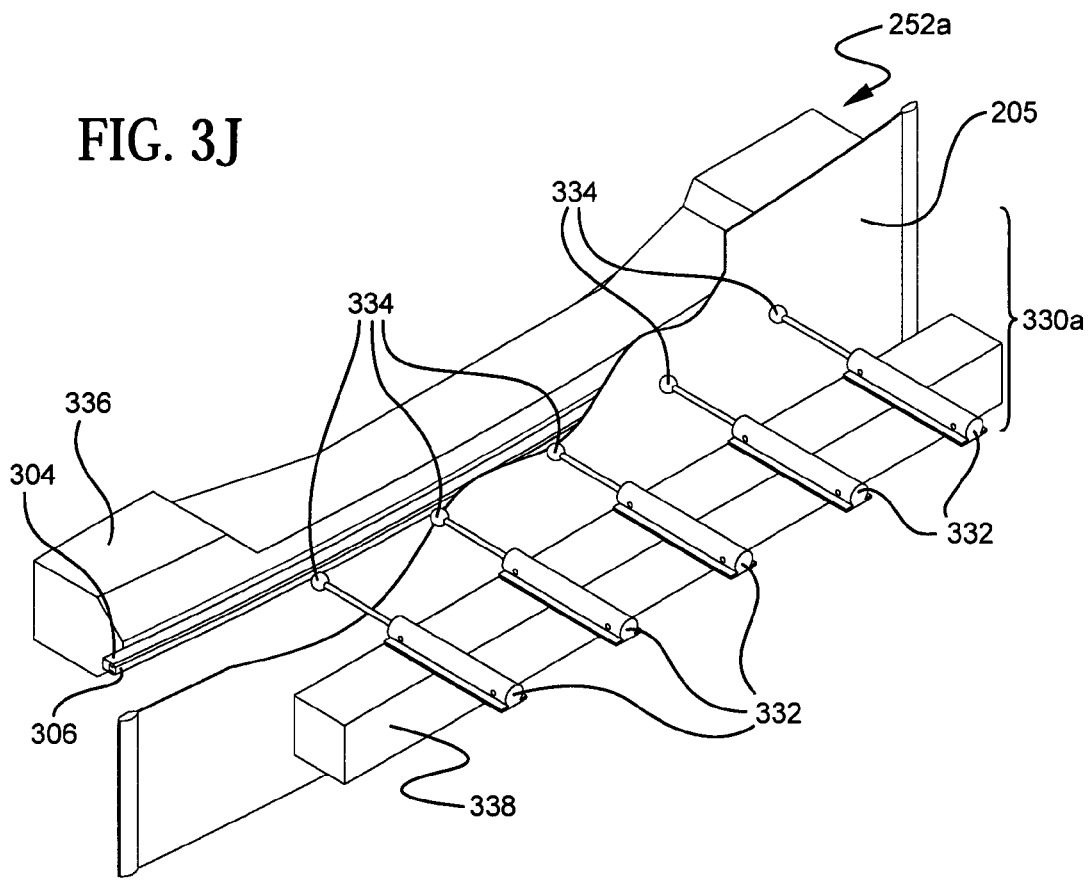
Figure 3K:
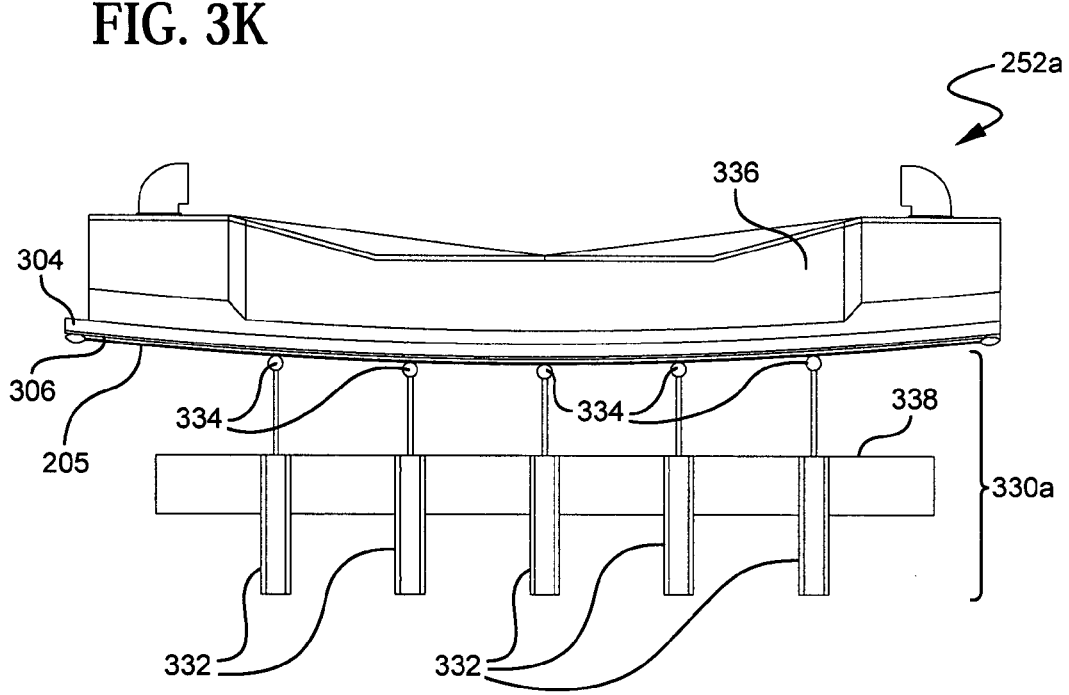
Figure 3L:
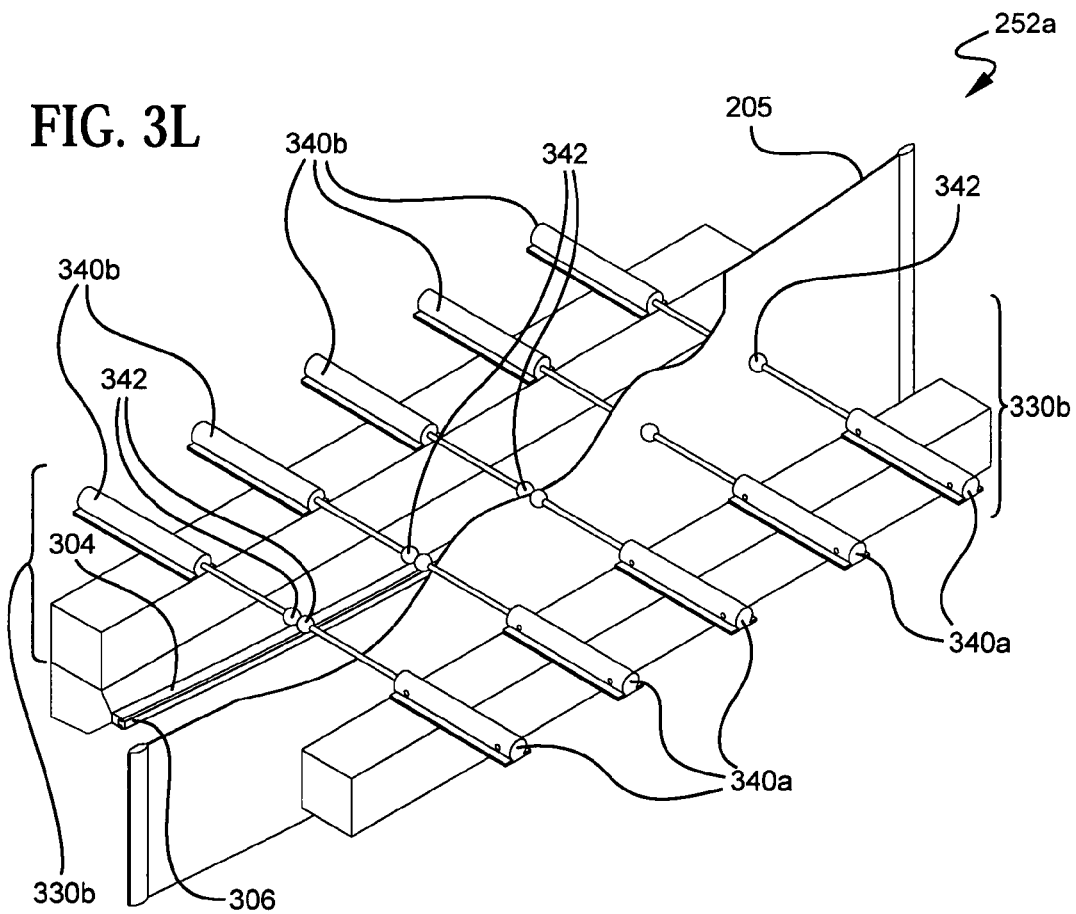
Figure 3M:
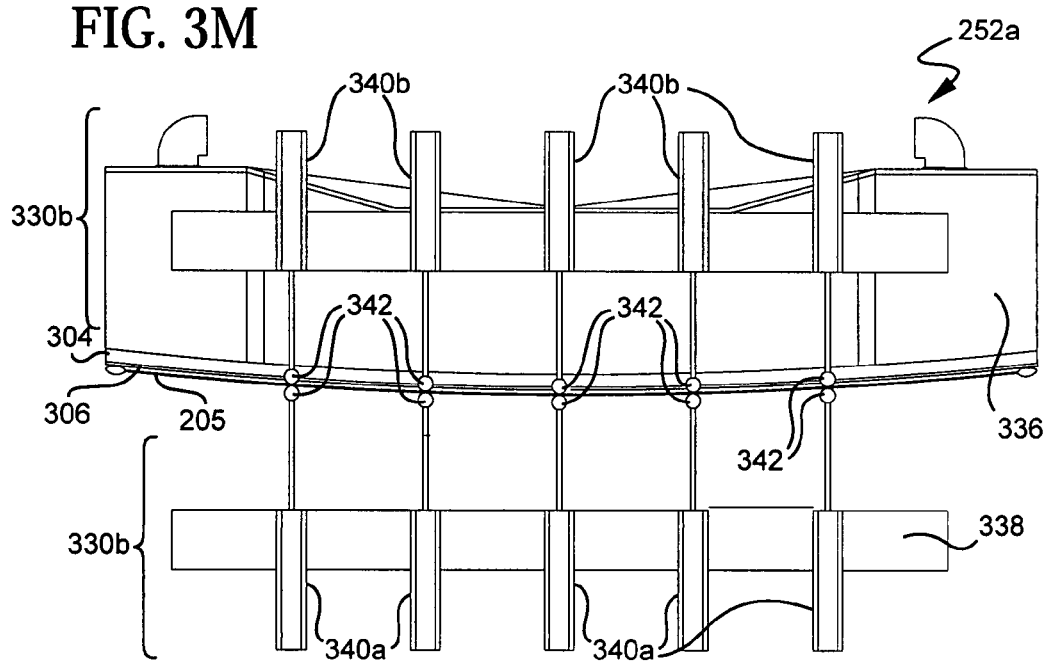
Figure 3N:
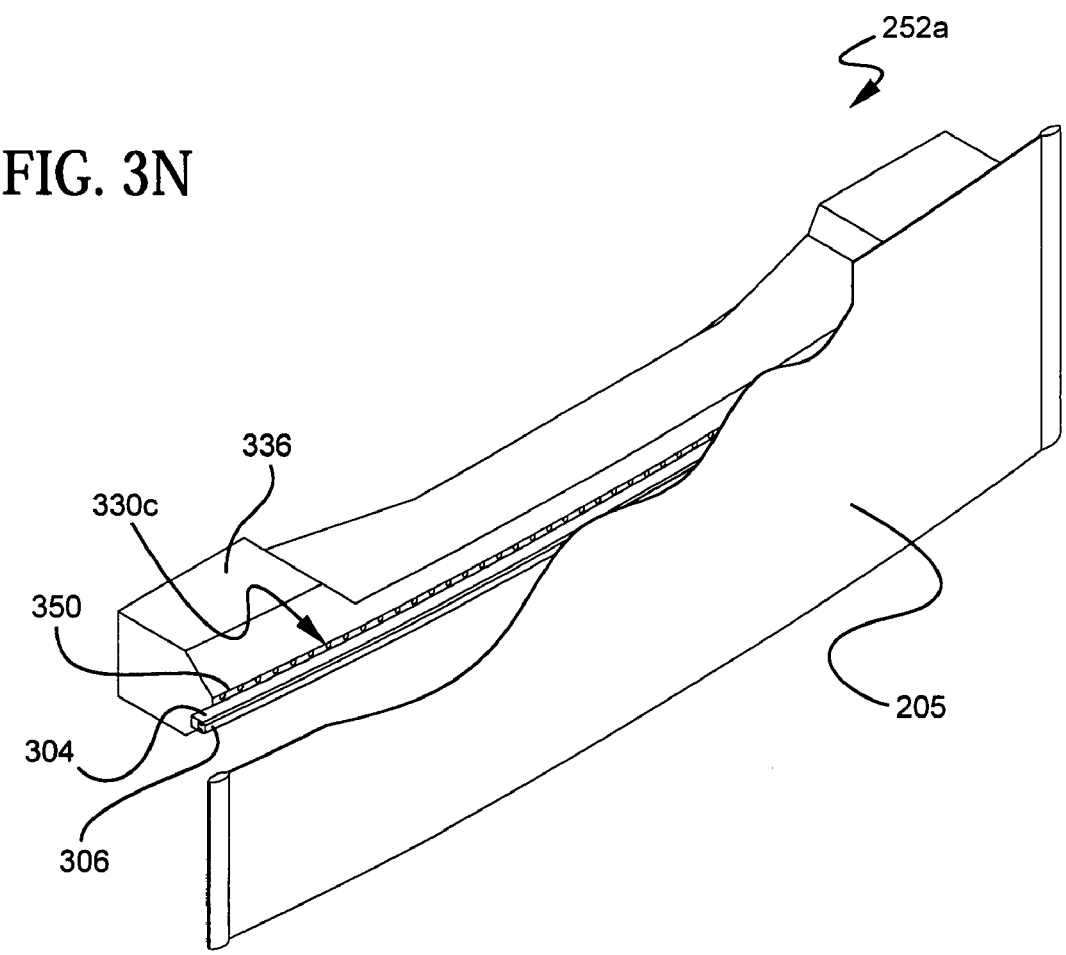
Figure 3O:
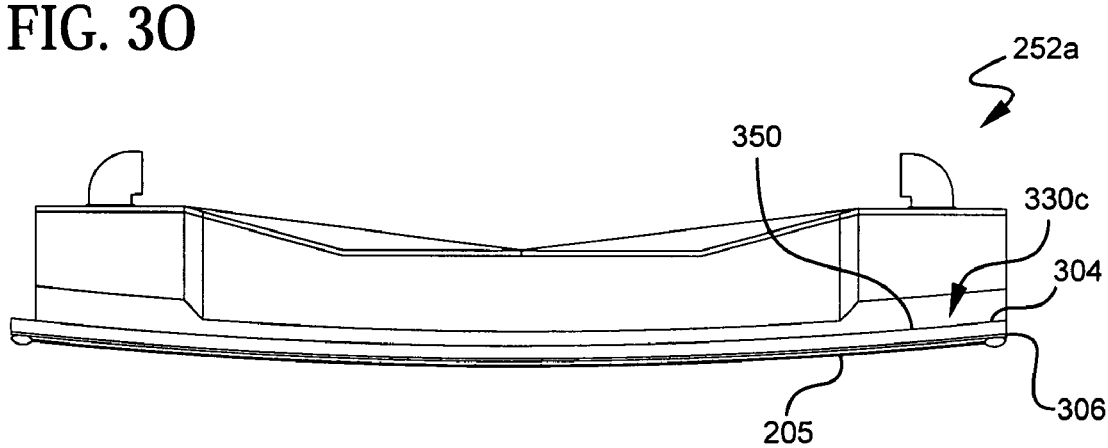

Referring to FIGS. 3A-3O, there are several diagrams which illustrate a first embodiment of the conformable nosing device 252a in accordance with the present invention. In FIGS. 3A-3B, there are respectively shown a perspective view and a top view of a TAM 250a which illustrates how the conformable nosing device 252a can be setup to have a bowed shape that matches the bowed shape of the glass sheet 205 and how the scoring device 254a can be positioned so it can move along a beam 380 (which is part of the TAM 252a) and score the exposed side of the glass sheet 205. An exemplary constant force scoring device 254a that could be used to score the bowed glass sheet 205 has been disclosed and discussed in detail within the aforementioned U.S. patent application Ser. No. 11/801,212.

In FIGS. 3C-3D, there are two perspective views which illustrate in greater detail the basic components of the conformable nosing device 252a (note: the conformable nosing device 252a itself is mounted to the frame 384 of the TAM 252a as shown in FIGS. 3A-3B). The conformable nosing device 252a includes a flexible beam 304 (e.g., metal/nonferrous flexible beam 304) which has on one side 308 thereof a nosing material 306 (e.g., rubber nosing material 306) attached thereto which contacts the glass sheet 205 during the scoring and separating processes (see FIGS. 3A-3B). The conformable nosing device 252a also includes a support bracket 310 and several extendable elements 312 (e.g., linear stages 312, motor driven precision position devices 312). As shown, the extendable elements 312 are separated from one another and attached to both the flexible beam 304 and the support bracket 310. In practice, the actual number of extendable elements 312 used and the size/cross section of the flexible beam 304 could be determined by a finite element analysis to achieve both a flexibility target during the adjustment process and a rigidity target during the scoring process.

Each extendable element 312 has a first end 314 (e.g., base plate 314) attached to a predetermined location on the support bracket 310 and a second end 316 (e.g., pinned joint 316a, sliding joint 316b) attached to a predetermined location on a second side 318 of the flexible beam 304. In this example, each extendable element 312 has two knobs 320 and 322 which are used to secure the base plate 314 to the support bracket 310 (note: this is done once the respective extendable element 312 has been moved to the desired position on the support bracket 310). Plus, each extendable element 312 has a handle 324 connected to a top plate 326 which is movably secured to the base plate 314. The handle 324 can be turned one way to extend the top plate 326 (which moves on top of the base plate 314) outward towards the flexible beam 304 so as to push that portion of the flexible beam 304 away from the support bracket 310. Or, the handle 324 can be turned another way to retract the top plate 326 inward away from the flexible beam 304 so as to pull that portion of flexible beam 304 back towards the support bracket 310. Alternatively, an automated motor-driven device (not shown) may be used to move the top plate 326 towards or away from the flexible beam 304. As shown, each extendable element 312 can incorporate a gauge/scale 328 which indicates the current position of the top plate 326 relative to a neutral position (starting position).

As described above, each extendable element 312 can be either: (1) extended to push on the flexible beam 304; (2) retracted to pull on the flexible beam 304; or (3) left in a neutral position that neither pushes on or pulls on the flexible beam 304. Thus, once the bow of the glass sheet 205 is determined through measurement (ultrasonic, ultra violet or laser ranging sensors, or a Linear Variable Differential Transducer (LVDT)), the individual extendable elements 312 can be locked in place on the support bracket 310 and then adjusted, either manually or automatically, such that the flexible beam 304 conforms to match the bowed shape of the glass sheet 205 (note: an on-line glass sheet profile measurement system could be used to automatically set up the conformable nosing device 252a).

In this embodiment, the extendable element 312' which is located on the left side of the support bracket 310 has a pinned joint 316a which is attached to the flexible beam 304. This extendable element 312' acts as a lateral reference point for the remaining extendable elements 312 which have sliding joints 316b attached to the flexible beam 304 (note: if desired, another extendable element 312 such as the center one or the one on the right side can have the pinned joint 316a). The remaining extendable elements 312 have sliding joints 316b because they permit a certain amount of lateral motion and tilting motion of the flexible beam 304. Plus, the remaining extendable elements 312 have sliding joints 316b because they help to manage any thermally induced distortion of the flexible beam 304 that otherwise might uncontrollably distort the shape of the flexible beam 304.

The conformable nosing device 252a can be set up to have a shape that corresponds with any one of the different shapes that the glass sheet 205 has been observed in the past to exhibit during the manufacturing process. For example, the conformable nosing device 252a can have extendable elements 312 setup such that the flexible beam 304 has any one of these configurations: (1) the positive bell shape (see FIG. 3E—this shape is common with Gen 5 glass sheets 205); (2) the negative bell shape (see FIG. 3F—this shape is common with Gen 5 glass sheets 205); (3) the S-shape (see FIG. 3G—this shape is common with Gen 7 glass sheets 205); (4) the M-shape (see FIG. 3H—this shape is common with Gen 7 glass sheets 205); and (5) the W-shape (see FIG. 3I—this shape is common with Gen 7 glass sheets 205).

The conformable nosing device 252a can be utilized during a "bow pop" situation where the original direction of the bow in the glass sheet 205 reverses directions or changes shape during the manufacturing process (e.g., the glass sheet 205 can change from having a positive bell shape to a negative bell shape). In this situation, the conformable nosing device 252a can be quickly changed to have a flat set up so an operator can push the glass sheet 205 back into the original bowed shape and then the conformable nosing device 252a can be re-set back into the original bowed shape. Alternatively, the conformable nosing device 252a can be quickly changed either manually or automatically to have the same bowed shape as the re-shaped glass sheet 205.

If desired, the conformable nosing device 252a may also incorporate a passive nosing device 330a, 330b or 330c to help make sure that the glass sheet 205 contacts the nosing material 306 on the flexible beam 304 and to help minimize the glass sheet motion transferred upwards to the FDM 141. In FIGS. 3J-3K, there is an embodiment shown where the conformable nosing device 252a has a passive nosing device 330a that includes an array of constant force air cylinders 332 where each air cylinder 332 has a tip 334 (e.g., rubber tip 334, ruby tip 334, ceramic tip 334) extending therefrom which contacts one side of the glass sheet 205 which is opposite to the side of the glass sheet 205 that is contacting the flexible beam 304 (note: the extendable elements 312 and support bar 310 are enclosed within a cover 336). In this embodiment, the constant force air cylinders 332 (such as Airpel®) are mounted on the TAM's traveling frame 338 which moves towards the glass sheet 205 when the glass sheet 205 is suppose to contact the nosing material 306 and before the scoring device 254 (not shown) scores the glass sheet 205. The constant force air cylinders 332 can accommodate different profiles in the glass sheet 205 and can apply a uniform contact force across the glass sheet 205 to push it towards the flexible beam 304. The positive grip of glass sheet 205 above the score line on the nosing material 306 further helps to minimize the motion of the glass sheet 205 which is caused by the scoring and separating processes.

In FIGS. 3L-3M, there is another embodiment shown where the conformable nosing device 252a has a passive nosing device 330b which includes two arrays of constant force air cylinders 340a and 340b that respectively contact both sides of the glass sheet 205 (note: the extendable elements 312 and support bar 310 are enclosed within a cover 336). In this embodiment, the first array of constant force air cylinders 340a are mounted on the TAM's traveling frame 338 which moves towards the glass sheet 205 when the glass sheet 205 is suppose to contact the nosing material 306 and before the scoring device 254 (not shown) scores the glass sheet 205. The second array of constant force air cylinders 340b are mounted just above the flexible beam 304 such that the individual air cylinders 340b are located directly across from the individual air cylinders 340a on the first array of constant force air cylinders 340a. Each air cylinder 340a and 340b has a tip 342 (e.g., rubber tip 342, ruby tip 342, ceramic tip 342) extending therefrom which contacts the glass sheet 205 and helps to position the glass sheet 205 on the flexible beam 304. In this example, all of the air cylinders 340a and 340b are set at the same air pressure such that the force acting on the glass sheet 205 will be cancelled out and the glass sheet 205 will retain its original shape and remain at its original position relative to the scoring device 154a. The positive grip of glass sheet 205 above the score line on the nosing material 306 further helps to minimize the motion of the glass sheet 205 which is caused by the scoring and separating processes.

In FIGS. 3N-3O, there is yet another embodiment shown where the conformable nosing device 252a has a passive nosing device 330c which has an array of vacuum ports 350 that pull the glass sheet 205 towards the flexible beam 304 (note: the extendable elements 312 and support bar 310 are enclosed within a cover 336). In this embodiment, the vacuum ports 350 are shown located above the nosing material 306 and flexible beam 304 and function to pull the glass sheet 205 towards the flexible beam 304 before the scoring device 254 (not shown) scores the glass sheet 205. The vacuum ports 350 can apply a uniform pulling force across the glass sheet 205 to pull it towards the flexible beam 304. If desired, there could be an array of vacuum ports (not shown) located below the nosing material 306 in addition to the upper array of vacuum ports 350. The positive grip of glass sheet 205 above the score line on the nosing material 306 further helps to minimize the motion of the glass sheet 205 which is caused by the scoring process and separating processes. For the conformable nosing devices 252a shown in FIGS. 3J-3O, it is desirable if the air cylinders or the vacuum ports are controlled to gradually release the glass sheet 205 after the scoring and separating processes so as to help reduce the motion of the glass sheet 205 and the motion of the newly cut glass sheet 205.

Figure 4:
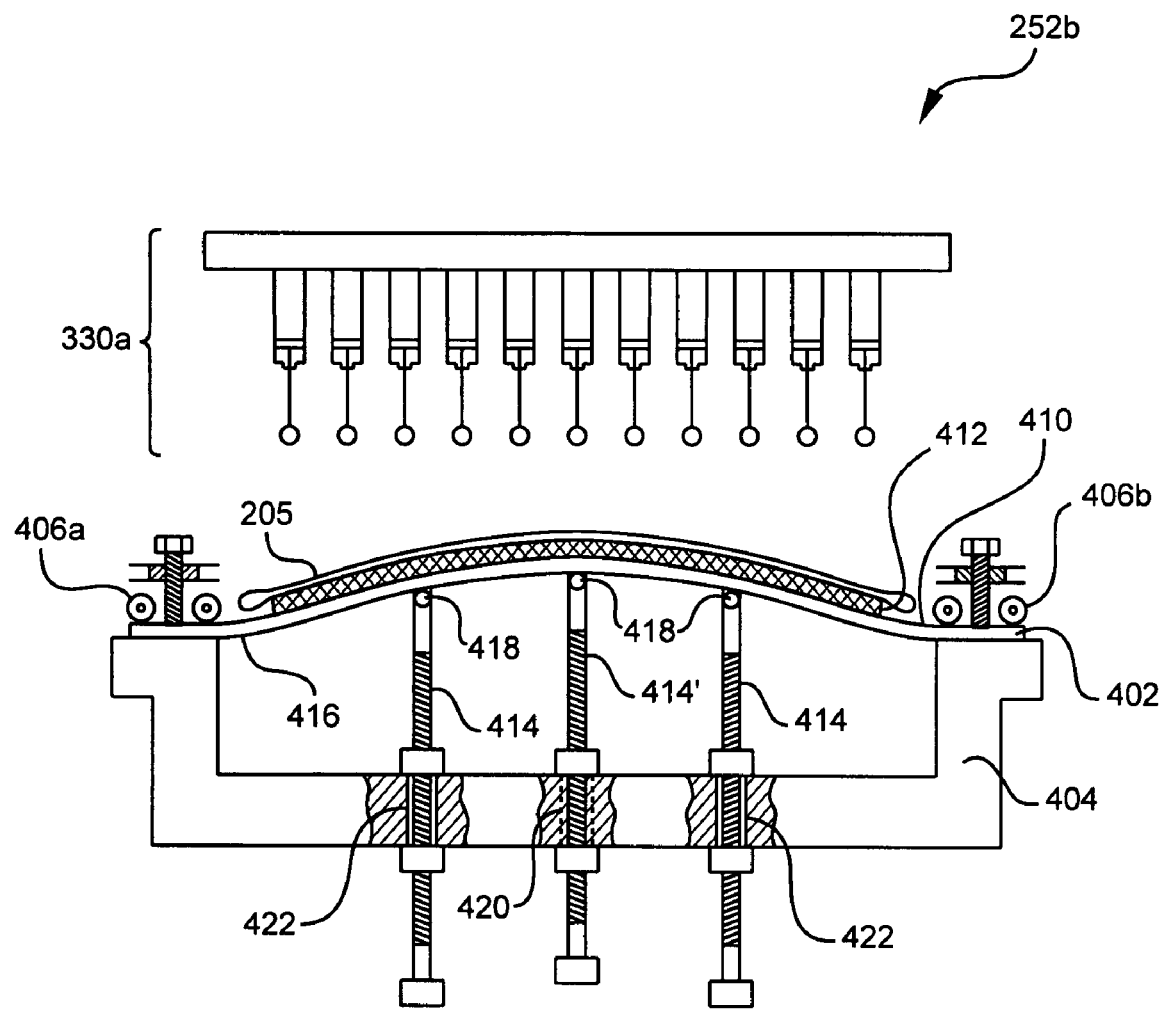
FIG. 4 is a diagram which illustrates in greater detail the various components of another conformable nosing device in accordance with a second embodiment of the present invention.

Referring to FIG. 4, there is a diagram associated with a second embodiment of the conformable nosing device 252b in accordance with the present invention. As shown, the conformable nosing device 252b has a flexible beam 402 (e.g., metal/nonferrous flexible beam 402) with an appropriately chosen cross section that is supported at two ends by a support bracket 404 and two edge rollers 406a and 406b. The flexible beam 402 has one side 410 with a nosing material 412 (e.g., rubber nosing material 412) attached thereto which contacts one side of the glass sheet 205 (see FIG. 2).

The conformable nosing device 252b has a group of extendable elements 414 (only three shown)(these can be manual or motorized threaded screw assemblies 414, locking-rod type pneumatic cylinders 414, or similarly functioning devices 414) which are attached to a back side 416 of the flexible beam 402 with appropriate joint elements 418 (note: the joint elements 418 could be slotted to accommodate any thermal expansion of the various components in the conformable nosing device 252b). In one possible configuration, the center extendable element 414' (e.g., bolt 414') is mounted on the support bracket 404 through a threaded hole 420. The two side extendable elements 414 (e.g., bolts 414) are also mounted on the support bracket 404 but they are mounted through clearance holes 422. The clearance holes 422 are used since they can accommodate a slight angular tilt of the flexible beam 402 that occurs during the nosing adjustment and during the scoring and separating processes. In addition, the clearance holes 422 are used to help accommodate the thermal expansion of either or both the flexible beam 402 and the support bracket 404. Alternatively, the extendable elements 414 could be secured to the flexible beam 402 by using the aforementioned sliding joints 316a and 316b (see FIGS. 3C and 3D).

The conformable nosing device 252b can be set up to have a shape that corresponds with any one of the different shapes that the glass sheet 205 has been observed in the past to exhibit during the manufacturing process (e.g., see FIGS. 3E-3I). In addition, the conformable nosing device 252b can utilize any one of the aforementioned passive nosing devices 330a, 330b and 330c to further help minimize the motion of the glass sheet 205 caused by the scoring and separating processes (note: the conformable nosing device 252b is shown in this example utilizing the first embodiment of the passive nosing device 330a). If desired, the support bracket 404 can also be adjusted sideways to track possible shifts in the location of the glass sheet 205 (note: the first embodiment of the conformable nosing device 252a could also be designed to track any sideway shifts of the glass sheet 205).

From the foregoing, it should be readily appreciated by those skilled in the art that a glass manufacturing system 200 which uses a fusion process can incorporate and use a conformable nosing device 252 to help minimize the motion of a glass sheet 205 during the scoring and separating processes. However, it should also be appreciated that any type of glass manufacturing system which draws molten glass to make a glass sheet could also incorporate and use the conformable nosing device 252. In fact, the conformable nosing device 252 could be used to help score other types of materials in addition to glass sheets like plexi-glass etc. . . . Accordingly, the conformable nosing device 252 of the present invention should not be construed in a limited manner.

Although several embodiments of the present invention have been illustrated in the accompanying Drawings and described in the foregoing Detailed Description, it should be understood that the invention is not limited to the embodiments disclosed, but is capable of numerous rearrangements, modifications and substitutions without departing from the spirit of the invention as set forth and defined by the following claims.

The invention claimed is:

1. A conformable nosing device for contacting a glass sheet while manufacturing the glass sheet, comprising:
    a flexible beam;
    a nosing material attached to a first side of said flexible beam;
    a support bracket; and
    a plurality of extendable elements, wherein each extendable element has a first end attached to a predetermined location on said support bracket and a second end attached to a predetermined location on a second side of said flexible beam, and wherein each extendable element is either extended to push on said flexible beam, retracted to pull on said flexible beam or left in a neutral position that neither pushes on or pulls on said flexible beam such that said flexible beam is conformed to have a bowed shape to substantially match a bowed shape of the glass sheet while the glass sheet is in contact with the nosing material, wherein the conformable nosing device is provided with a scoring device configured to score the glass sheet while the flexible beam maintains a bowed shape that substantially matches the bowed shape of the glass sheet in contact with the nosing material.

2. The conformable nosing device of claim 1, wherein each extendable element is:
    a bolt;
    a linear stage; or
    a motor driven precision position device.

3. The conformable nosing device of claim 1, wherein each extendable element includes a scale to indicate how much each extendable element has been extended to push on said flexible beam or retracted to pull on said flexible beam.

4. The conformable nosing device of claim 1, wherein each extendable element has a pinned joint or a sliding joint located at said second end of each extendable element which is attached to said flexible beam.

5. The conformable nosing device of claim 1, wherein each of the extendable elements is manually adjusted such that the bowed shape of the flexible beam substantially matches the bowed shape of the piece of material.

6. The conformable nosing device of claim 1, wherein each of the extendable elements is automatically adjusted such that the bowed shape of the flexible beam substantially matches the bowed shape of the piece of material.

7. The conformable nosing device of claim 1, wherein said flexible beam is conformed to have any one of the following bowed shapes:
    a positive bell shape;
    a negative bell shape;
    a S-shape;
    a M-shape; or
    a W-shape.

8. The conformable nosing device of claim 1, further comprising a passive nosing device which includes a plurality of pneumatic cylinders each having a material on a tip thereof which contacts the piece of material on a side opposite to the side contacting the nosing material on said flexible beam.

9. The conformable nosing device of claim 1, further comprising a passive nosing device which includes a plurality of vacuum ports that pull the piece of material closer to the nosing material on said flexible beam.

10. The conformable nosing device of claim 1, further comprising:
a first passive nosing device which includes a plurality of pneumatic cylinders each having a material on a tip thereof which contacts the piece of material on a side opposite to the side contacting the nosing material on said flexible beam; and
a second passive nosing device which includes a plurality of pneumatic cylinders each having a material on a tip thereof which contacts the piece of material on the side which is also contacting the nosing material on said flexible beam.

11. A method of producing a glass sheet with the conformable nosing device of claim 1 comprising the steps of:
melting batch materials to form molten glass and processing the molten glass to form the glass sheet;
drawing the glass sheet using a fusion draw machine;
moving the conformable nosing device to engage a side of the glass sheet, where said conformable nosing device has a bowed shape that substantially matches a bowed shape of the glass sheet; and
scoring the glass sheet using the scoring device which has a score head that scores the glass sheet on an exposed side opposite to the side of the glass sheet contacting the conformable nosing device.

12. The method of claim 11, wherein said conformable nosing device further includes a passive nosing device having a plurality of pneumatic cylinders each with a material on a tip thereof which contacts the exposed side of the glass sheet that is opposite to the side contacting the conformable nosing device.

13. The method of claim 11, wherein said conformable nosing device further includes a passive nosing device having a plurality of vacuum ports which pull the glass sheet closer to said conformable nosing device.

14. The method of claim 11, wherein said conformable nosing device further includes:

a first passive nosing device having a plurality of pneumatic cylinders each with a material on a tip thereof which contacts the exposed side of the glass sheet that is opposite to the side contacting the conformable nosing device; and
a second passive nosing device having a plurality of pneumatic cylinders each with a material on a tip thereof which contacts the side of glass sheet that is contacting the conformable nosing device.

15. The method of claim 11, wherein said conformable nosing device further includes a passive nosing device which can be controlled to help minimize motion of the glass sheet while the glass sheet is being scored and separated into individual glass sheets.

16. A glass manufacturing system including the conformable nosing device of claim 1, the glass manufacturing system further comprising:
at least one vessel for melting batch materials and forming molten glass;
a forming vessel for receiving the molten glass and forming a glass sheet;
a fusion draw machine for drawing the glass sheet; and
a traveling anvil machine including the conformable nosing device and the scoring device.

17. The glass manufacturing system of claim 16, wherein said conformable nosing device further includes a passive nosing device having a plurality of pneumatic cylinders each with a material on a tip thereof which contacts the exposed side of the glass sheet that is opposite to the side contacting the conformable nosing device.

18. The glass manufacturing system of claim 16, wherein said conformable nosing device further includes a passive nosing device having a plurality of vacuum ports which pull the glass sheet closer to said conformable nosing device.

19. The glass manufacturing system of claim 16, wherein said conformable nosing device further includes:
a first passive nosing device having a plurality of pneumatic cylinders each with a material on a tip thereof which contacts the exposed side of the glass sheet that is opposite to the side contacting the conformable nosing device; and
a second passive nosing device having a plurality of pneumatic cylinders each with a material on a tip thereof which contacts the side of glass sheet that is contacting the conformable nosing device.

* * * * *